United States Patent
Choi

(10) Patent No.: US 7,427,113 B2
(45) Date of Patent: Sep. 23, 2008

(54) BALL AND SOCKET MOUNT FOR SHOCK ABSORBER OF TORSION BEAM AXLE SUSPENSION

(75) Inventor: Min-Seok Choi, Kyunggi-do (KR)

(73) Assignee: Hyundai Mobis Co., Ltd., Youngin-shi (KR)

( * ) Notice: Subject to any disclaimer, the term of this patent is extended or adjusted under 35 U.S.C. 154(b) by 95 days.

(21) Appl. No.: 10/748,244

(22) Filed: Dec. 31, 2003

(65) Prior Publication Data

US 2005/0099060 A1    May 12, 2005

(30) Foreign Application Priority Data

Nov. 11, 2003    (KR) .................. 10-2003-0079344

(51) Int. Cl.
*B60G 21/05* (2006.01)
*F16C 11/06* (2006.01)
*F16D 1/12* (2006.01)

(52) U.S. Cl. .................. 301/124.1; 280/124.128; 403/90; 403/142

(58) Field of Classification Search .............. 301/124.1, 301/127, 137; 280/124.106, 124.11, 124.128, 280/124.13, 124.157; 267/2, 64.11; 403/56, 403/76, 90, 141, 142
See application file for complete search history.

(56) References Cited

U.S. PATENT DOCUMENTS

| | | | | |
|---|---|---|---|---|
| 3,201,142 A * | 8/1965 | Dangauthier | ......... | 280/124.128 |
| 3,843,272 A * | 10/1974 | Jorn | ............ | 403/132 |
| 3,962,575 A * | 6/1976 | Vandenberg et al. | ........ | 248/340 |
| 4,007,924 A * | 2/1977 | Jorn et al. | .................. | 267/282 |
| 4,039,205 A * | 8/1977 | Castanier | ............ | 280/124.109 |
| 4,132,376 A * | 1/1979 | Sharples | ................ | 244/104 R |
| 4,232,881 A * | 11/1980 | Kolbel et al. | .......... | 280/124.128 |
| 4,432,564 A * | 2/1984 | Tronville | ............. | 280/124.106 |
| 4,550,926 A * | 11/1985 | MacIsaac | ................ | 280/5.509 |
| 4,921,225 A * | 5/1990 | Ludwig | .................. | 267/64.13 |
| 5,005,856 A * | 4/1991 | Shibahata | ............ | 280/124.128 |
| 5,419,522 A * | 5/1995 | Luecke et al. | .......... | 248/288.51 |
| 5,487,522 A * | 1/1996 | Hook | ......................... | 248/549 |
| 5,611,555 A * | 3/1997 | Vidal | ........................ | 280/282 |
| 5,692,767 A * | 12/1997 | Kato | ................... | 280/124.142 |
| 5,813,691 A * | 9/1998 | Aoki et al. | ............ | 280/124.106 |
| 5,845,885 A * | 12/1998 | Carnevali | ................ | 248/181.1 |
| 6,010,119 A * | 1/2000 | Hsiao | ...................... | 267/64.12 |
| 6,079,700 A * | 6/2000 | Solomond et al. | .......... | 267/221 |
| 6,086,162 A * | 7/2000 | Pinch et al. | ............. | 301/124.1 |
| 6,152,468 A * | 11/2000 | Glaser et al. | .......... | 280/124.134 |
| 6,550,869 B2* | 4/2003 | Dantele | ................... | 301/124.1 |
| 6,581,892 B2* | 6/2003 | Carnevali | ................ | 248/276.1 |
| 6,767,153 B1* | 7/2004 | Holbrook | ..................... | 403/56 |

(Continued)

FOREIGN PATENT DOCUMENTS

KR    20-0278494    6/2002

*Primary Examiner*—Russell D Stormer
(74) *Attorney, Agent, or Firm*—Greenblum & Bernstein, P.L.C.

(57) ABSTRACT

A torsion beam axle suspension is provided, in which a shock absorber is directly mounted on right and left trailing arms and is further mounted to the mount by a ball joint. Thus, it is possible to reduce the weight and production expenses, thus to enhance productivity. Further, it is possible to considerably decrease a friction caused by movement of the shock absorber even though the transverse force is applied, thus to enhance the riding comfort.

7 Claims, 4 Drawing Sheets

U.S. PATENT DOCUMENTS

| | | | | |
|---|---|---|---|---|
| 6,860,013 B1 * | 3/2005 | Durand | | 29/897.2 |
| 7,044,565 B2 * | 5/2006 | Kang | | 301/127 |
| 2002/0053777 A1 * | 5/2002 | Yamaguchi | | 280/124.135 |
| 2002/0117890 A1 * | 8/2002 | Glaser et al. | | 301/127 |
| 2002/0134149 A1 * | 9/2002 | Shiraishi et al. | | 73/146 |
| 2005/0047851 A1 * | 3/2005 | Molenaar | | 403/122 |

* cited by examiner

[FIG. 1] PRIOR ART
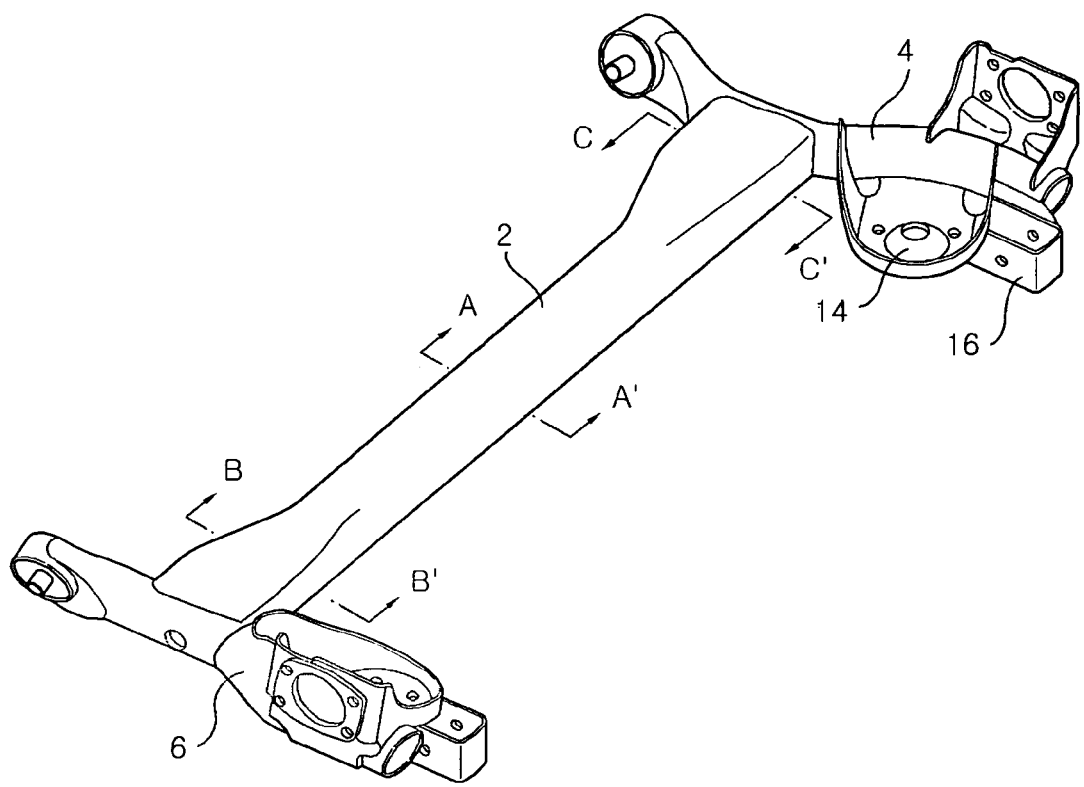

[FIG. 2]
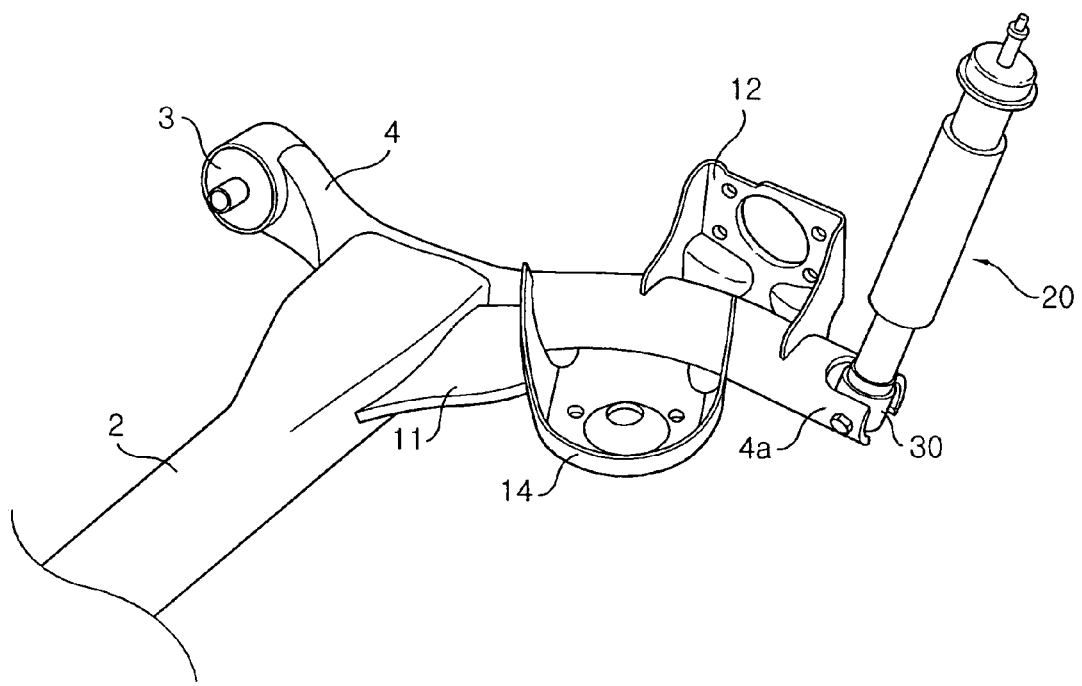

[FIG. 3]
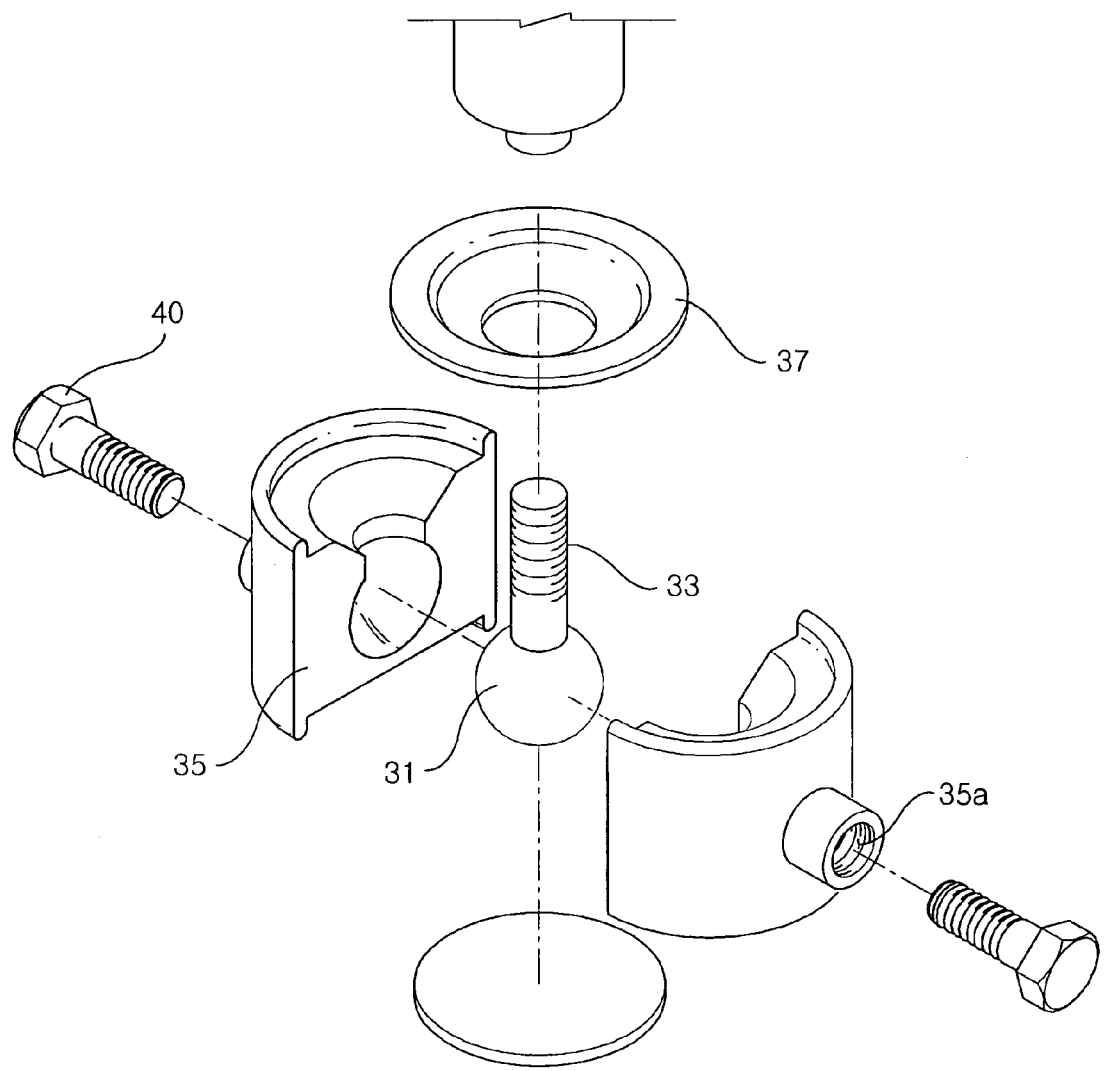

[FIG. 4]
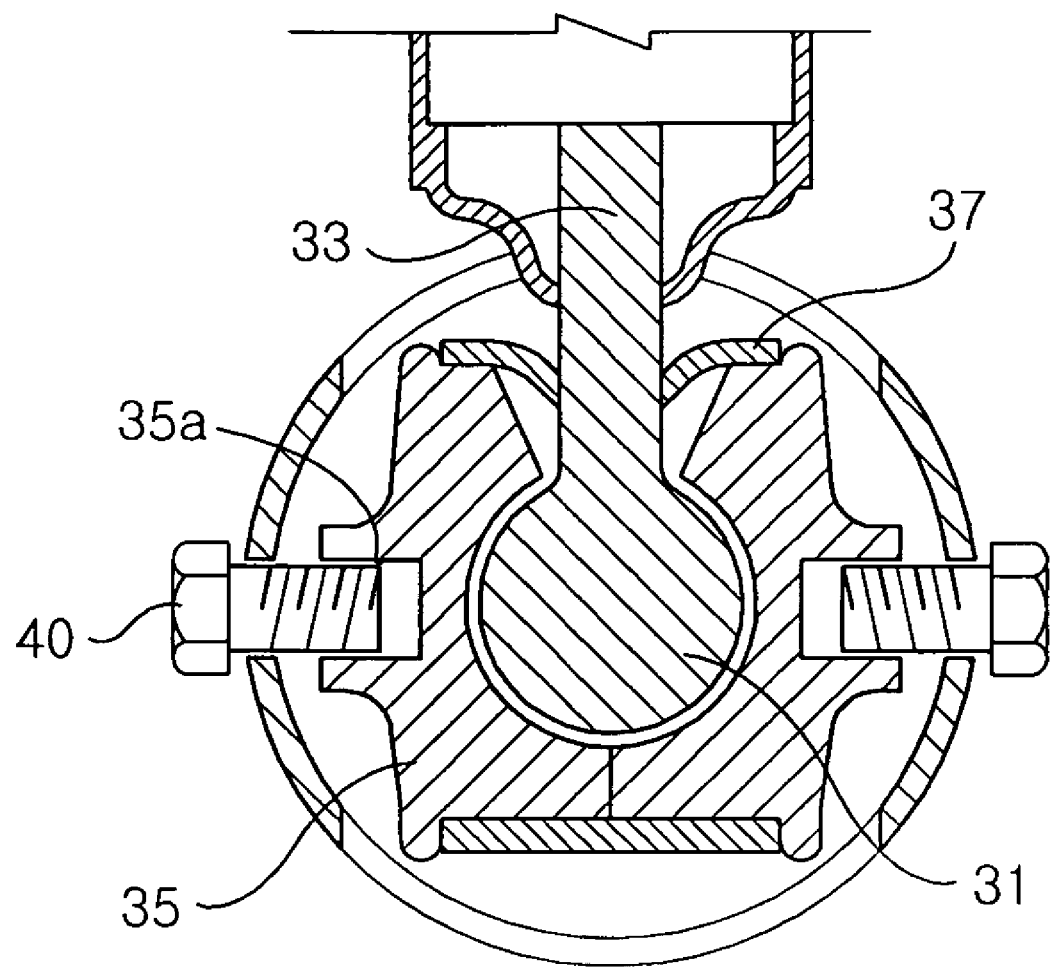

BALL AND SOCKET MOUNT FOR SHOCK ABSORBER OF TORSION BEAM AXLE SUSPENSION

RELATED APPLICATIONS

The present disclosure relates to subject matter contained in priority Korean Application No. 10-2003-0079344, filed on Nov. 11, 2003, which is herein expressly incorporated by reference in its entirety.

BACKGROUND OF THE INVENTION

1. Field of the Invention

The present invention relates to a torsion beam axle suspension, and more particularly to a torsion beam axle suspension in which a shock absorber is directly mounted on right and left trailing arms and is further mounted to the mount by a ball joint.

2. Description of the Related Art

In general, a suspension is the apparatus, which is provided between a body and a wheel, for preventing vibration or shock transmitted from a road surface during traveling from being directly transmitted to a body, thus preventing a damage of the body as well as securing riding comfort and stability. In the vehicle, a torsion beam axle suspension used for a suspension for rear wheels includes an U- or V-shape torsion beam made of a high strength steel plate, as well as trailing arms, lateral rods, shock absorbers and coil springs, which are attached to both ends of the torsion beam. The torsion beam axle suspension has three types, i.e., an axle beam type (V-shape), a pivot axle type (reversed V-shape) and a coupled beam type (H-shape).

One example of a conventional torsion beam axle suspension is disclosed in Korean Patent No. 20-0278494 in detail.

FIG. 1 is a perspective view illustrating a conventional torsion beam axle suspension. As shown in FIG. 1, a torsion beam 2 of the conventional torsion beam axle suspension is formed by pressure forming of a pipe. The torsion beam 2 has both sides welded to trailing arms 4 and 6, one end of which are each connected with a body via a bushing, and the other end is each coupled to a wheel. The trailing arms 4 and 6 are each welded with a lower spring seat 14, which fixedly supports the coil spring. Further, the trailing arms 4 and 6 are welded with a mounting bracket 16 for a shock absorber, which is disposed on one side of the lower spring seat 14 to fix the shock absorber.

However, the foregoing torsion beam axle suspension has the following problem.

The shock absorber is fastened using the mounting bracket for the shock absorber via the bushing on the lower end thereof, so that a frictional resistance caused by a transverse force is increased to deteriorate the riding comfort.

SUMMARY OF THE INVENTION

To solve the above-indicated problems, it is, therefore, an object of the present invention to provide a torsion beam axle suspension capable of reducing the weight and production expenses as well as enhancing productivity.

It is another of the present invention to provide a torsion beam axle suspension capable of considerably decreasing a friction caused by movement of the shock absorber even though the transverse force is applied, thus enhancing the riding comfort.

It is yet another object of the present invention to provide a torsion beam axle suspension capable of easily adjusting a position of the shock absorber without exchange of parts, thus improving productivity and assembling capability, as well as obtaining easy management and cost saving by sharing of the parts.

To achieve the above objects, there is provided a torsion beam axle suspension including left and right trailing arms disposed in a longitudinal direction of a body; and a torsion beam coupled to the left and right trailing arms, wherein the left and right trailing arms are each provided with a mount for mounting a shock absorber.

With this construction, a separate mounting bracket for the shock absorber is not required, so that it is possible to reduce the weight and production expenses, thus to enhance productivity.

Further, the shock absorber is mounted to the mount by a ball joint. Thereby, it is possible to considerably decrease a friction caused by movement of the shock absorber even though the transverse force is applied, thus to enhance the riding comfort.

Here, the ball joint includes a socket bored with at least one insert hole, into which a fastener is inserted, on both sides thereof, and a ball stud including a ball pivotably fitted in the socket and a stud mounted to the shock absorber. Thereby, the position of the shock absorber can be easily adjusted without exchange of parts. As a result, productivity and assembling capability can be improved.

Further, the parts may be shared, so that it is possible to obtain easy management and cost saving.

BRIEF DESCRIPTION OF THE DRAWINGS

The above objects, features and advantages of the present invention will become more apparent from the following detailed description when taken in conjunction with the accompanying drawings, in which:

FIG. 1 is a perspective view illustrating a conventional torsion beam axle suspension;

FIG. 2 is a perspective view illustrating a torsion beam axle suspension according to a preferred embodiment of the present invention;

FIG. 3 is an exploded perspective view illustrating the shock absorber and the mount of FIG. 2; and FIG. 4 is an assembly cross-sectional view of FIG. 3.

DETAILED DESCRIPTION OF THE PREFERRED EMBODIMENT

A preferred embodiment of the present invention will now be described with reference to the accompanying drawings. In the following description, same drawing reference numerals are used for the same elements even in different drawings. The matters defined in the description such as a detailed construction are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 2 is a perspective view illustrating a torsion beam axle suspension according to a preferred embodiment of the present invention, FIG. 3 is an exploded perspective view illustrating the shock absorber and the mount of FIG. 2, and FIG. 4 is an assembly cross-sectional view of FIG. 2.

As shown in FIG. 2, a torsion beam axle suspension of this embodiment includes left and right trailing arms disposed in a longitudinal direction of a body, and a torsion beam 2 coupled to the left and right trailing arms.

The left trailing arm 4 is coupled to the body via a bushing 3 on the front side thereof, and to a spindle by a wheel connector 12 on the rear side thereof.

Further, the left trailing arm 4 is provided with a spring seat 14, which fixedly support a coil spring (not shown).

Here, a reinforcement bracket 11 may be welded between the torsion beam 2 and the left trailing arm 4 in order to reinforce rigidity.

The trailing arm 4 also is provided with a mount 4a on which a shock absorber 20 is mounted.

This mount 4a is preferably formed by cutting off a terminal end of the left trailing arm 4 which takes a pipe shape cut off, so that the mount 4a has a forked cut-off section.

The cut-off section formed on the terminal end of the left trailing arm 4 may be formed on an upper portion of the trailing arm 4, or on upper and lower portions of the trailing arm 4.

The mount 4a may be formed by cutting off the terminal end of the trailing arm 4, or may be formed by a hole so as to allow the shock absorber 20 to be mounted.

Both sides of the mount 4a are bored to have fastening holes into which a fastener is inserted to mount the shock absorber 20.

In FIG. 2, only the left trailing arm 4 has been shown and described, but this is equally true of the right trailing arm.

In this manner, by directly mounting the shock absorber 20 to the left trailing arm 4 by the mount 4a formed on the trailing arm 4, a separate mounting bracket for the shock absorber 20 is not required, so that it is possible to reduce a production expenses as well as a weight, which results in enhancement of productivity.

Meanwhile, the shock absorber 20 is preferably mounted to the mount 4a by a ball joint 30.

The ball joint 30 is constituted by a socket 35 and a ball stud, as shown in FIGS. 3 and 4.

Both sides of the socket 35 are bored with at least one insert hole 35a into which the fastener is inserted.

The insert hole 35a is preferably provided on the left and right sides of the socket 35.

In this manner, when the left and right sides of the socket 35 are each provided with the insert hole 35a, a position of the shock absorber 20 may be changed according to a fastening level of the fastener 40 inserted into the insert hole 35a.

Thus, in the case where the position of the shock absorber 20 is changed, it is possible to facilitate positioning of the shock absorber without exchanging parts. As a result, productivity and assembling capability can be improved.

Further, it is possible to share parts, which results in easy management and cost saving.

The ball stud consists of a ball 31 pivotably fitted in the socket and a stud 33 mounted to the shock absorber 20.

In order to prevent foreign matter from being introduced between the stud 33 and the socket 35, a dust cover 37 may be provided.

In this manner, when the shock absorber 20 is mounted to the mount 4a, the ball joint 30 is used. Thus, it is possible to considerably reduce friction caused by the movement of the shock absorber 20, even under the application of the transverse force; thereby, enhancing the riding comfort.

As mentioned in the prior art, there are three types of torsion beam axle suspensions, such as an axle beam type (V-shape), a pivot axle type (reversed V-shape) and a coupled beam type (H-shape). Herein, even though the coupled beam type has been described as example, it is apparent that the description can be applied either to the axle beam type or the pivot axle type.

While the invention has been shown and described with reference to certain preferred embodiments thereof, it will be understood by those skilled in the art that various changes in form and details may be made therein without departing from the spirit and scope of the invention as defined by the appended claims.

According to the torsion beam axle suspension of the present invention as set forth above, there are the following effects.

First, the left and right trailing arms are each provided with the mount on which the shock absorber is mounted, the shock absorbers are directly mounted to the left and right trailing arms, respectively. For example, the mount may be provided inside of the outermost end of the trailing arms as illustrated in FIG. 2. Thus, a separate mounting bracket for the shock absorber are not required, so that it is possible to reduce the weight and production expenses, thus to enhance productivity.

Second, when the shock absorber is mounted to the mount by the ball joint, it is possible to considerably decrease a friction caused by movement of the shock absorber even though the transverse force is applied, thus to enhance the riding comfort.

Third, both sides of the socket of the ball joint are bored with at least one insert hole, so that the position of the shock absorber can be changed according to the fastening level of the fastener which is inserted into both insert holes.

Thus, because the position of the shock absorber may be changed, the position of the shock absorber can be easily adjusted without exchange of parts. As a result, productivity and assembling capability can be improved.

Further, the parts can be shared, so that it is possible to accomplish easy management and cost saving.

What is claimed is:

1. A torsion beam axle suspension, comprising:
   left and right trailing arms disposed in a longitudinal direction of a body;
   a wheel connector provided on each of the left and right trailing arms; and
   a torsion beam coupled to the left and right trailing arms,
   wherein the left and right trailing arms are each provided with a mount provided inside of the outermost end of the left and right trailing arms that mounts a shock absorber, and wherein the shock absorber is mounted rearward of the wheel connector in a longitudinal direction of each of the left and right trailing arms, the mount comprising:
   a ball joint having a generally cylindrical socket, insertion holes provided on opposing surfaces of the socket, and fasteners inserted into the insertion holes, the fasteners being provided on opposing surfaces of the socket such that longitudinal axes of opposing fasteners are co-axially aligned with each other, the fasteners being configured to adjust a position of the shock absorber.

2. The torsion beam axle suspension as claimed in claim 1, wherein the ball joint further comprises a ball stud including a ball pivotably fitted in the socket and a stud that mounts to the shock absorber.

3. The torsion beam axle suspension as claimed in claim 1, wherein each of the left and right trailing arms includes a portion configured as a mount that receives the shock absorber.

4. A torsion beam axle suspension, comprising:
   left and right trailing arms disposed along a longitudinal direction of a body;
   a wheel connector provided on each of the left and right trailing arms; and
   a torsion beam coupled to the left and right trailing arms, wherein a mount that receives a shock absorber is provided inside of the outermost end of the left and right trailing arms, and wherein the shock absorber is mounted rearward of the wheel connector in a longitudinal direction of each of the left and right trailing arms, the mount comprising:

a ball joint having a generally cylindrical socket, insertion holes provided on opposing surfaces of the socket, and fasteners inserted into the insertion holes, the fasteners being provided on opposing surfaces of the socket such that longitudinal axes of opposing fasteners are co-axially aligned with each other, the fasteners being configured to adjust a position of the shock absorber.

5. The torsion beam axle suspension as claimed in claim 4, wherein the ball joint further comprises a ball stud including a ball pivotably fitted in the socket and a stud that mounts to the shock absorber.

6. A torsion beam axle suspensions comprising:

left and right trailing arms disposed along a longitudinal direction of a body;

a wheel connector provided on each of the left and right trailing arms; and a torsion beam coupled to the left and right trailing arms, wherein a mount that receives a shock absorber is formed in the outermost end of the left and right trailing arms and wherein the shock absorber is mounted rearward of the wheel connector in a longitudinal direction of each of the left and right trailing arms, the mount comprising:

a ball joint having a generally cylindrical socket, insertion holes provided on opposing surfaces of the socket, and fasteners inserted into the insertion holes, the fasteners being provided on opposing surfaces of the socket such that longitudinal axes of opposing fasteners are co-axially aligned with each other, the fasteners being configured to adjust a position of the shock absorber.

7. The torsion beam axle suspension as claimed in claim 6, wherein the ball joint further comprises a ball stud including a ball pivotably fitted in the socket and a stud that mounts to the shock absorber.

* * * * *